United States Patent [19]
Cason

[11] Patent Number: 6,067,933
[45] Date of Patent: May 30, 2000

[54] CONTROLLED ANIMAL FEED INTAKE APPARATUS

[76] Inventor: Lloyd C. Cason, 295 Buttercup La., Carrollton, Ga. 30116

[21] Appl. No.: 09/235,919

[22] Filed: Jan. 25, 1999

[51] Int. Cl.$^7$ ...................................................... A01K 5/02
[52] U.S. Cl. ............................................................. 119/52.1
[58] Field of Search .................................. 119/52.1, 56.2, 119/57.1, 57.2, 57.4

[56] References Cited

U.S. PATENT DOCUMENTS

| | | | |
|---|---|---|---|
| 3,197,016 | 7/1965 | Jones | 119/57.1 |
| 3,199,731 | 8/1965 | Brauer et al. | 119/57.1 |
| 3,415,228 | 12/1968 | Myers . | |
| 3,598,087 | 8/1971 | Ramser . | |
| 4,089,300 | 5/1978 | Keen et al. . | |
| 4,850,307 | 7/1989 | Sheets . | |

Primary Examiner—Thomas Price
Attorney, Agent, or Firm—Herbert M. Hanegan; J. Rodgers Lunsford, III; Charles L. Warner, II

[57] ABSTRACT

A feed intake apparatus for a livestock feeding system is disclosed having a hopper with a feed inlet which receives feed from a feed supply source and a feed outlet, hopper having upper and lower switches regulating the amount of feed in hopper; a housing connected to the bottom of hopper having a feed inlet which receives feed from hopper and a feed outlet, housing having a body which generally converges downwardly and inwardly from said feed inlet toward feed outlet; a feed conveyor attached to housing, feed conveyor comprising a conveyor tube with a feed auger housed therein, feed auger having a multiplicity of substantially equally spaced flights and being driven within conveyor for conveying feed through conveyor tube; and an agitation device within housing.

20 Claims, 2 Drawing Sheets

CONTROLLED ANIMAL FEED INTAKE APPARATUS

BACKGROUND OF THE INVENTION

This invention relates to animal or poultry feeding systems in which a pulverant, fluent feed is conveyed to a series of feeding stations where it is dispensed for chickens (or other animals or birds) to eat, and, more particularly, to a feed intake unit to which the feedstock is delivered and from which it is conveyed.

Poultry feeding systems are well-known in the art. See, for example, U.S. Pat. Nos. 4,850,370; 4,460,230; 4,003,339; 3,971,340; 3,598,087; 3,415,228; and 3,230,933. As shown in these representative patents, feedstock from a bulk feed tank or the like is delivered to an intake hopper. From the hopper, the feed is delivered to a conveying means which services a number of feeding stations. In large poultry houses, one of these conveying means may have a length of up to 400 feet and there may be 200–300 or so of the feeding stations. The feed is conveyed, usually by means of an auger, in a feed conveyor tube extending through each of the feed stations. The auger may either be rotary driven or axially propelled within the tube to convey the feed from the intake hopper and from feeder to feeder. Feed is deposited from the conveying means into feed pans of the feeders located at each station for subsequent consumption by the birds.

SUMMARY OF THE INVENTION

Among the several objects of the present invention is the provision of a feed intake means for use in a poultry feeder system;

A further object is the provision of such an intake means for delivering feed from a feed supply source to a conveying means by which the feed is conveyed to a plurality of feeding sites;

Another object is the provision of a conveying means which uses an auger for moving the feed between the intake and the stations;

An additional object is the provision of a means for delivering feed including mechanisms which regulate the feed level in a hopper;

The provision of such an intake means permits the auger to be driven without undue packing of the feed in the conveyor once the feed stations are filled thereby to insure, upon startup of conveyor, that feed is delivered substantially simultaneously to all of the feed stations;

The provision of such an intake means also produces agitation, stirring, jostling, or the like to break up clumps in the feed and prevent feed from packing or jamming before the conveyor.

The provision of such an intake means is usable with existing feed conveyor systems.

In accordance with the invention, generally stated, a feed intake apparatus is used in a poultry feeding system for transferring feed from a feed supply to a conveyor by which the feed is delivered to stations spaced along the conveyor. A feed hopper with an inlet and outlet receives feed in the inlet from a feed supply. Limit switches are mounted on a side of the hopper and determine the amount of feed in the hopper. The switches are connected to a control device which regulates the amount of feed supplied from the feed source and thereby regulates the amount of feed in the hopper, assuring an adequate level of feed without the constant cycling on and off of the feed supply pump. The hopper outlet is connected to a housing which has a feed inlet and a feed outlet. The housing inlet is connected to the feed hopper outlet for feed to flow from the hopper into the housing. A feed conveyor is connected to the housing outlet. Feed flows through the housing and onto the conveyor through the outlet. A feed transport auger is positioned in the conveyor. The auger is normally movable through a tube which scrapes excess feed off the auger and helps regulate the flow of feed into the conveyor. An agitator (e.g., blades connected to a rotatable shaft) is positioned within the housing and is connected to receive motive force from the auger. As the auger moves the feed through the conveyor it provides the force which in turn rotates the agitator. The agitator is thereby repeatedly rotated to produce a stirring action in the housing which breaks up clumps in the feed and helps the feed to flow. Advantageously, the housing contains two agitators, one driven by the auger which transports feed in one direction and the other driven by the auger which transports feed in the opposite direction. When two agitators are used, the agitators may be connected by a chain-gear type arrangement whereby when only one auger is operating both agitators are activated.

Other object features will be apparent from the following description.

DESCRIPTION OF PREFERRED EMBODIMENTS

Figure 1:
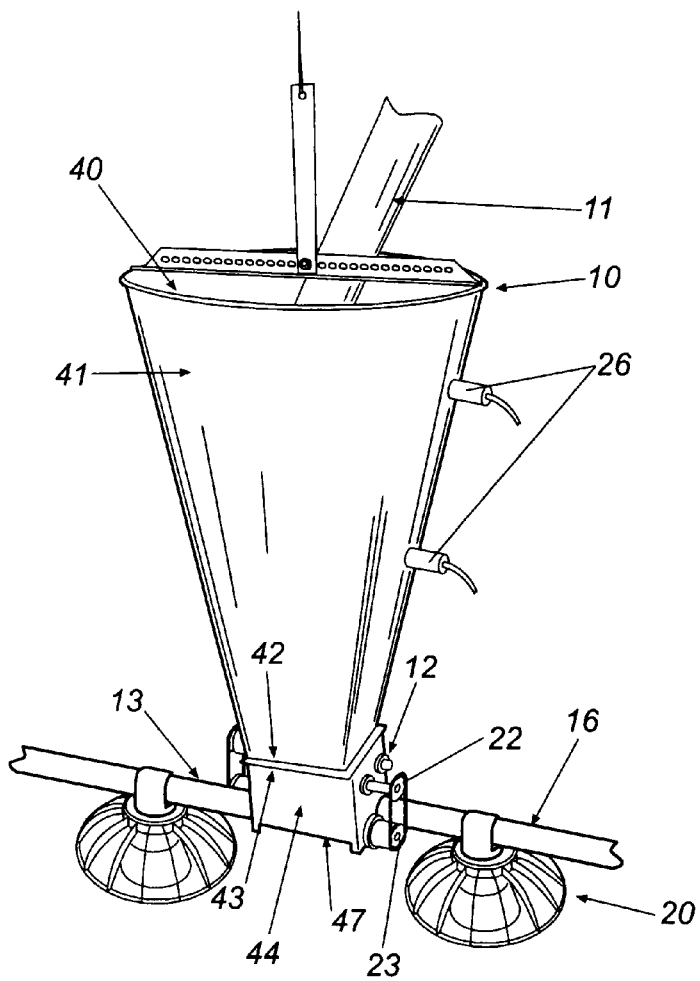
FIG. 1 is a front view of the poultry feed intake apparatus of the present invention showing the hopper, the limit switches on the side of the hopper, the chain-drive connection of the two agitation gears, the intake housing, a feed supply tube, a conveyor and feed stations with feed intake cups.
Figure 3:
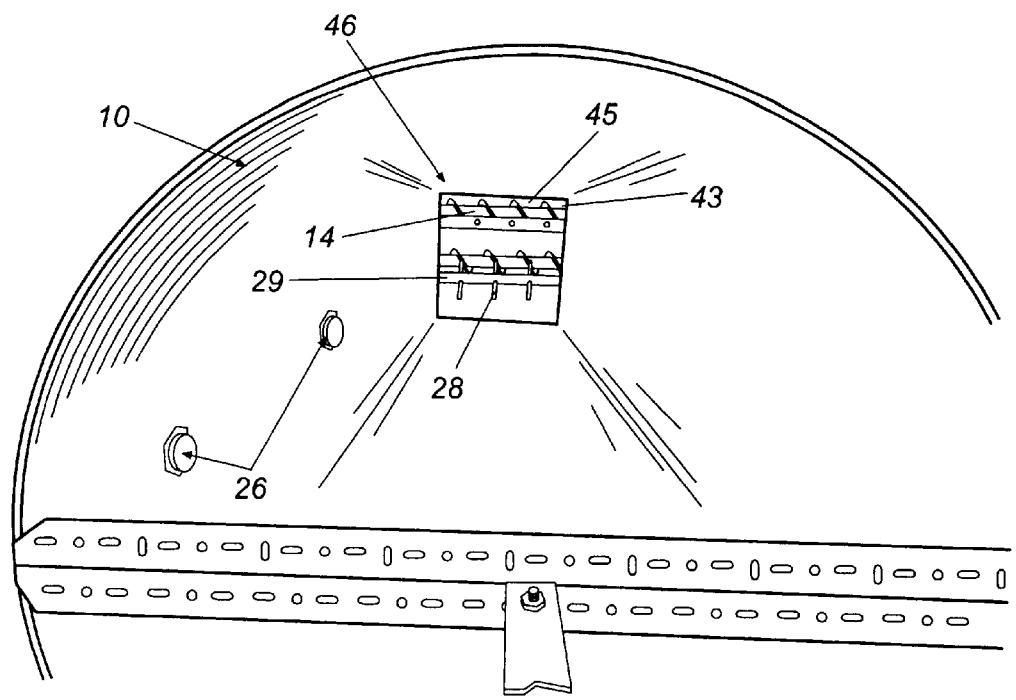
FIG. 3 is a top view of the hopper of the present invention illustrating the connection of the hopper outlet to the housing inlet, the position of the limit switches on the side of the hopper, the agitation means within the housing, and the auger.

Referring to the drawings, a poultry feed intake apparatus for poultry feeding systems which comprises the present invention is indicated generally in FIGS. 1 and 3. The apparatus includes a hopper 10 into which feed is received from a feed supply 11 (see FIG. 1 showing feed supply tube). From hopper 10, the feed gravity flows into a housing 12 and from there enters a conveyor 13. The latter includes a conveyor tube 16 in which an auger 14 (shown in FIG. 3) is located. Preferably, auger 14 is a centerless auger having the appearance of a stretched out coil spring. Auger 14 is driven by a drive mechanism thereby causing the feed to be transferred thru conveyor tube 16 to one or more feeding stations 20. Auger 14 may be rotatably or linearly driven by the drive mechanism. Auger 14 may be linearly propelled through conveyor tube 16 by means of a drive gear 22 having gear teeth in mesh with the flight of the auger 24. Such a drive means is described in U.S. Pat. No. 4,460,230.

Alternatively, the auger 14 may be rotary driven within the conveyor tube 16 such that the auger 14 acts like a screw to convey the feed through the conveyor tube 16. Other well-known feed conveyors (e.g., chain conveyor) maybe used. When auger 14 is linearly propelled, conveyor tube 16 may contain an endless closed track system in which the conveyor is arranged in a closed loop configuration. Additional drive mechanisms and additional feed intakes may be located along the loop to facilitate movement of feed to the various feeders.

In FIGS. 1 and 3, a first embodiment of the invention is shown to include a hopper 10. The hopper 10 has a generally circular upper end 40 having walls 41 and a feed supply 11 which provides a supply of feed to hopper 10. It will be appreciated that feed may be supplied to hopper 10 by means other than feed supply 11. For example, feed may be supplied by means of a suitable drop tube (not shown). The walls 41 slope narrow inwardly and downwardly to a rectangular shape to form a feed outlet 42 for attachment to the housing 12. Mounted on the side of the hopper 10 are upper and lower limit switches 26 which determine the amount of feed in the hopper 10 and regulate the amount of feed input by the feed supply through the use of a controller (not shown).

FIGS. 1 and 3, also show housing 12 which has a generally rectangular upper end 43 the side walls 44 of which define a feed inlet 45. Respective flanges 46 are formed at the upper end of each side wall for attachment of the housing intake to the outlet of the hopper 10. Side walls 44 of housing 12 also have a lower tapered section 47 for the lower end of the housing 12 to define an outlet into which feed flows from the intake into conveyor tube 16.

Feed conveyor 16 is connected to the outlet of housing 12 so the feed flowing through housing 12 can flow into the conveyor. Conveyor 16 includes a conveyor tube having an inlet end at the outlet of the housing 12 and a series of spaced outlets, one at each feed station 20. In addition to helping to define outlet of the housing, a base portion also provides a housing for auger 14. The auger moves rotatably in or linearly through the base portion of housing 12 for conveying feed falling from the hopper 10 to conveyor 16 and to be distributed to the outlets.

Optionally, a baffle may be placed within housing 12 having one end attached to a side wall of the housing at the upper end. The baffle angles downwardly into housing 12 to form a chute for the feed delivered to intake 45 from hopper 10.

Figure 2:
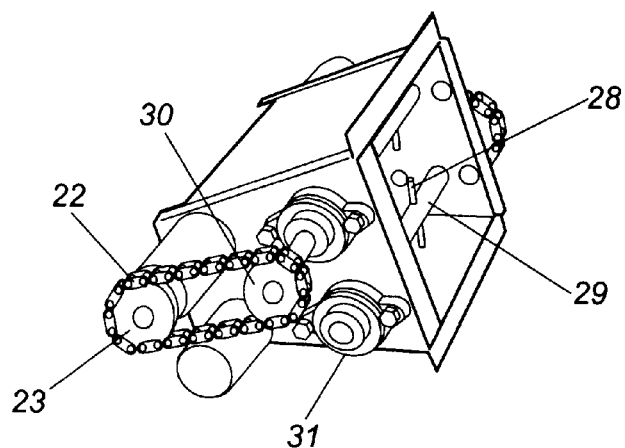
FIG. 2 is a side view of the housing of the present invention illustrating the conveyor tubes connected to the housing, the bearings mounted on the side of the housing, and the chain-drive connection of the two agitation means.
Figure 4:
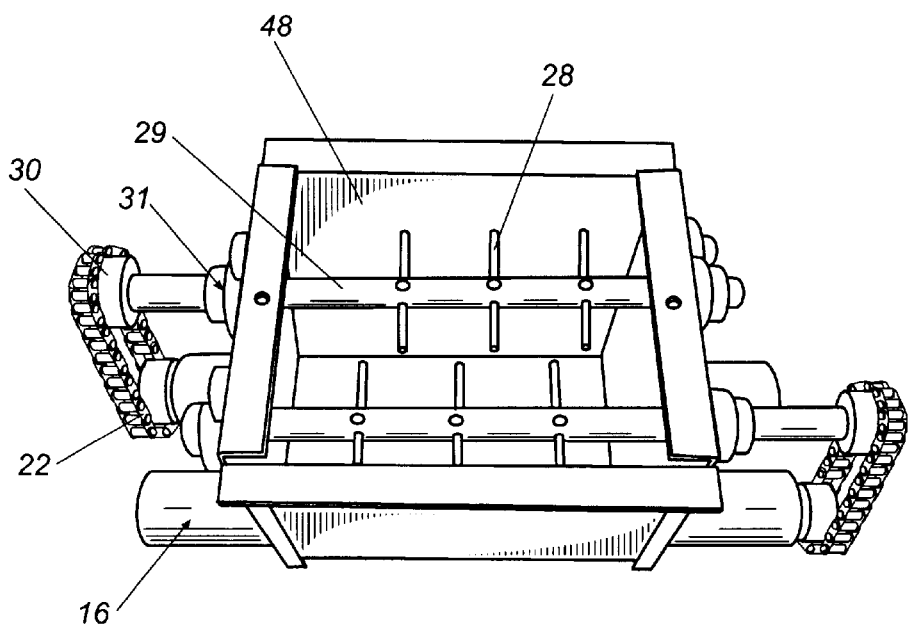
FIG. 4 is a top view of the housing of the present invention showing the two agitation means having a chain-drive connection, said chain-drive connection connected to a gear mounted on a rotatable shaft having spokes as agitation members, said shaft supported by bearings mounted on the housing.

FIGS. 2 and 4 show agitator 48 positioned in housing 12 so as to agitate the feed falling into the housing. By churning or stirring the feed within housing 12, any lumps will be broken up, the feed will not bridge within the housing 12, and will thus flow continuously down toward the conveyor 16. Agitator 48 includes members 28 mounted for rotation on shaft 29. The agitation members are mounted on the shaft so they are at spaced intervals to each other along the shaft as shown in FIG. 4. Shaft 29 extends through the side wall 44 and is rotatably supported by bearings 31. A gear 30 is fixedly mounted on shaft 29. The gear is connected by a chain-type drive 22 mounted to receive motive force from or provide motive force to a gear on the shaft of another agitation member. Thus when only one of the two augers which deliver to feed in opposite directions is in operation, both agitation members are engaged. Movement (either axially or rotary) of the auger imparts motion to the shaft, and causes rotation of agitation members 28. This produces the stirring action discussed above.

Another problem associated with prior art feeding systems is the constant on and off cycling of the feed supply pump which increases maintenance and replacement problems with the pump, motor and supply lines. The present invention provides limit switches 26 mounted on the side of the hopper which prevent this problem by determining the amount of feed in the hopper and relaying this information to a controller which adjusts the amount of feed supplied to the hopper. For instance, if a switch is activated ("on") then this signals the controller that the level of feed supply is at least at the vertical level at which the switch is mounted. The use of multiple limit switches, such as an embodiment of the invention which has two such switches, enables the determination of the level of feed more precisely. For instance, if a second limit switch mounted on the side of the hopper at a position vertically higher than the first limit switch has not been activated ("off") and the first lower limit switch has been activated ("on") the level of feed is determined to be at a vertical position somewhere between the two switches. The limit switches send this information to a control device which adjusts the amount of feed supplied to the hopper by turning the feed supply pump motor on and off, thus controlling the supply of feed to the hopper and the feed level therein, thereby accurately regulating the level of feed in the hopper. Advantageously, the limit switches are pressure limit switches, optically activated limit switches, or capacitor-resistor switches. Preferably the feed level is controlled by capacitor-resistor limit switches.

It will be appreciated that agitator 48 may be alternatively driven by an external means other than by being connected to the auger. If such an arrangement is desired an electric motor may provide the drive means for agitator 48.

Preferably, the feed intake apparatus hopper is manufactured of a material selected from the group consisting of metal, metal alloy, plastic, polymer, composite, fiberglass, ceramic, and mixtures thereof. Advantageously, the feed housing is manufactured of a material selected from the group consisting of metal, metal alloy, plastic, polymer, composite, fiberglass, ceramic, and mixtures thereof. Advantageously, the feed agitation members are manufactured of a material selected from the group consisting of metal, metal alloy, plastic, polymer, composite, fiberglass, ceramic, and mixtures thereof.

Preferably, the feed intake apparatus hopper is coated with a material which prevents feed from sticking to the hopper surface. Advantageously, the feed housing is coated with a material which prevents feed from sticking to the housing surface. Advantageously, the feed agitation members are coated with a material which prevents feed from sticking to their surfaces.

Preferably, the feed intake apparatus hopper is coated with Teflon. Advantageously, the feed housing is coated with Teflon. Advantageously, the feed agitation members are coated with Teflon.

What has been described is an improved feed intake apparatus for use in a poultry feeder system by which feed is delivered from a hopper 10 to a feed conveyor and thereby conveyed to a plurality of feeding sites. The conveyor system uses an auger for moving the feed and the improved apparatus of the present invention eliminates clumps of feed from reaching the auger. The apparatus simply and easily eliminates clumps of feed which could otherwise cause jamming of the auger. It does this by agitating or stirring the feed and regulating the level of feed in the hopper. This not only breaks up clumps of feed but also helps prevent potential jamming.

In view of the foregoing, it will be seen that the several objects of the invention are achieved and other advantageous results are obtained.

As various changes could be made in the above constructions without departing from the scope of the invention, it is intended that all matter contained in the above description or shown in the accompanying drawings shall be interpreted as illustrative and not in a limiting sense.

What is claimed is:

1. A feed intake apparatus for a livestock feeding system, said apparatus comprising:
   (a) a hopper having a feed inlet which receives feed from a feed supply source and a feed outlet, said hopper having a means of regulating the amount of feed in said hopper;
   (b) a housing connected to the bottom of said hopper having a feed inlet which receives feed from said hopper and a feed outlet, said housing having a body which generally converges downwardly and inwardly from said housing feed inlet toward said housing feed outlet;
   (c) a feed conveyor attached to said housing, said feed conveyor comprising a conveyor tube with a feed auger housed therein, said feed auger having a multiplicity of substantially equally spaced flights and being driven within said conveyor for conveying feed through said conveyor tube;
   (d) an agitation means within said housing; and
   (e) a drive means connected to said auger for imparting motion to the agitation means said agitation means comprising:
      i at least one rotatable shaft extending through the housing;
      ii rotatable shaft support bearings attached to opposite sides of the housing;
      iii feed agitation members mounted on said at least one rotatable shaft which break up clumps and reduce the occurrence of their formation thereby positively preventing jamming or compaction in said conveyor tube, said housing, and said hopper;
      iv a gear mounted on each of said at least one rotatable shaft on the exterior of said housing; and
      v a drive means connected to said gear for imparting motion to a second rotatable shaft extending through said housing.

2. The feed intake apparatus of claim 1 wherein said drive means is driven by the flights of said auger.

3. The feed intake apparatus of claim 1 wherein said drive means is an external source independent from said auger.

4. The feed intake apparatus of claim 1 wherein said agitation means comprises spokes attached to said rotatable shaft.

5. The feed intake apparatus of claim 1 wherein said agitation members comprise blades attached to said rotatable shaft.

6. The feed intake apparatus as set forth in claim 1 wherein said agitation means comprises at least two rotatable shafts.

7. The feed intake apparatus of claim 6 wherein the gears of the at least two agitation means are connected by drive chains.

8. The feed intake apparatus of claim 1 wherein said means of regulating the amount of feed in the hopper comprises:
   (a) upper and lower limit switches mounted on an interior side of said hopper and spaced apart vertically for detecting the amount of feed in hopper; and
   (b) a control device connected to said limit switches capable of initiating and ceasing the supply of feed to the hopper from the feed supply source, thereby assuring that the amount of feed in the hopper is sufficient to provide a continuous supply of feed to the auger.

9. The feed intake apparatus of claim 8 where said limit switches are pressure activated.

10. The feed intake apparatus of claim 8 where said limit switches are optically activated.

11. The feed intake apparatus of claim 8 where said limit switches are capacitance-resistance activated.

12. The feed intake apparatus of claim 1 wherein said hopper is manufactured of a material selected from the group consisting of metal, metal alloy, plastic, polymer, composite, fiberglass, ceramic, and mixtures thereof.

13. The feed intake apparatus of claim 1 wherein said feed housing is manufactured of a material selected from the group consisting of metal, metal alloy, plastic, polymer, composite, fiberglass, ceramic, and mixtures thereof.

14. The feed intake apparatus of claim 1 wherein said feed agitation members are manufactured of a material selected from the group consisting of metal, metal alloy, plastic, polymer, composite, fiberglass, ceramic, and mixtures thereof.

15. The feed intake apparatus of claim 1 wherein said hopper is coated with a material which prevents feed from sticking to the hopper surface.

16. The hopper of claims 15 wherein said material is a fluoropolymer.

17. The feed intake apparatus of claim 1 wherein said feed housing is coated with a material which prevents feed from sticking to the hopper surface.

18. The feed housing of claim 17 wherein said material is a fluoropolymer.

19. The feed intake apparatus of claim 1 wherein said feed agitation members are coated with a material which prevents feed from sticking to the hopper surface.

20. The feed agitation members of claim 19 wherein said material is a fluoropolymer.

* * * * *